United States Patent
Litvinov et al.

(10) Patent No.: US 6,531,202 B1
(45) Date of Patent: Mar. 11, 2003

(54) PERPENDICULAR MAGNETIC RECORDING MEDIA WITH REDUCED-NOISE SOFT MAGNETIC UNDERLAYER

(75) Inventors: Dmitri Litvinov, Pittsburgh, PA (US); Sakhrat Khizroev, Pittsburgh, PA (US); Mark Howard Kryder, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 122 days.

(21) Appl. No.: 09/724,112

(22) Filed: Nov. 28, 2000

Related U.S. Application Data

(60) Provisional application No. 60/168,147, filed on Nov. 29, 1999.

(51) Int. Cl.$^7$ .............................. G11B 5/66; G11B 5/70; B05D 5/12; H01F 1/00
(52) U.S. Cl. .................. 428/65.3; 428/611; 428/694 T; 428/694 TM; 428/900; 427/128; 427/131
(58) Field of Search .................. 428/694 TM, 694 TS, 428/900, 65.3, 611, 694 T; 427/128, 131

(56) References Cited

U.S. PATENT DOCUMENTS

| | | | |
|---|---|---|---|
| 4,410,603 A | 10/1983 | Yamamori et al. | 428/611 |
| 4,438,471 A | 3/1984 | Oshiki et al. | 360/125 |
| 4,541,026 A | 9/1985 | Bonin et al. | 360/121 |
| 4,546,398 A | 10/1985 | Toda et al. | 360/126 |
| 4,575,777 A | 3/1986 | Hosokawa | 360/123 |
| 4,613,918 A | 9/1986 | Kanai et al. | 360/113 |
| 4,629,660 A | 12/1986 | Sagoi et al. | 428/678 |
| 4,649,449 A | 3/1987 | Sawada et al. | 360/123 |
| 4,731,157 A | 3/1988 | Lazzari | 156/643 |
| 4,974,110 A | 11/1990 | Kanamine et al. | 360/126 |
| 5,738,927 A | 4/1998 | Nakamura et al. | 428/141 |
| 5,942,342 A | 8/1999 | Hikosaka et al. | 428/694 R |
| 6,094,328 A * | 7/2000 | Saito | 360/324.12 |
| 6,395,413 B1 * | 5/2002 | Ando | 428/694 T |

FOREIGN PATENT DOCUMENTS

JP 08-045068 A * 2/1996

OTHER PUBLICATIONS

Ando et al., "Triple–Layer Perpendicular Recording Media for High SN Ratio and Signal Stability", *IEEE Transactions on Magnetics*, Sep. 1997, pp. 2983–2985, vol. 33, No. 5.

* cited by examiner

Primary Examiner—Holly Rickman
(74) Attorney, Agent, or Firm—Alan G. Towner, Esq.; Pietragallo, Bosick & Gordon

(57) ABSTRACT

The present invention provides perpendicular recording media having a soft magnetic underlayer and magnetic regions which generate an external magnetic field in the soft magnetic underlayer. The soft magnetic underlayer is brought into a substantially single-domain state by the magnetic field, thereby reducing or eliminating unwanted noise in the soft underlayer. In a preferred embodiment, the recording medium includes a ring-shaped soft magnetic underlayer positioned between concentric ring-shaped magnetic regions.

24 Claims, 2 Drawing Sheets

PERPENDICULAR MAGNETIC RECORDING MEDIA WITH REDUCED-NOISE SOFT MAGNETIC UNDERLAYER

CROSS REFERENCE TO RELATED APPLICATION

This application claims the benefit of U.S. Provisional Patent Application Ser. No. 60/168,147 filed Nov. 29 1999.

FIELD OF THE INVENTION

The present invention relates to perpendicular magnetic recording media, and more particularly relates to media designed to suppress soft magnetic underlayer noise.

BACKGROUND INFORMATION

Perpendicular magnetic recording systems have been developed for use in computer hard disk drives. Some examples of perpendicular magnetic recording heads for use in such systems are described in U.S. Pat. No. 4,438,471 to Oshiki et al., U.S. Pat. No. 4,541,026 to Bonin et al., U.S. Pat. No. 4,546,398 to Toda et al., U.S. Pat. No. 4,575,777 to Hosokawa, U.S. Pat. No. 4,613,918 to Kania et al., U.S. Pat. No. 4,649,449 to Sawada et al, U.S. Pat. No. 4,731,157 to Lazzari, and U.S. Pat. No. 4,974,110 to Kanamine et al.

Some examples of perpendicular magnetic recording media are described in U.S. Pat. No. 4,410,603 to Yamamori et al., U.S. Pat. No. 4,629,660 to Sagoi et al., U.S. Pat. No. 5,738,927 to Nakamura et al., and U.S. Pat. No. 5,942,342 to Hikosaka et al.

One of the challenges to implement perpendicular recording is to resolve the problem of soft underlayer noise. The noise is caused by fringing fields generated by magnetic domains in the soft underlayer that can be sensed by the reader. For the write process to be efficient, high moment materials, e.g., $B_S > 20$ kG, may be used for the soft underlayer. If the domain distribution of such materials is not carefully controlled, very large fringing fields can introduce substantial amounts of noise in the read element. Not only can the reader sense the steady-state distribution of magnetization in the soft underlayer, but it can also affect the distribution of magnetization in the soft underlayer, thus generating time-dependent noise. Both types of noise should be minimized.

The present invention has been developed in view of the foregoing, and to address other deficiencies of the prior art.

SUMMARY OF THE INVENTION

The present invention provides perpendicular recording media having a soft magnetic underlayer and magnetic regions which generate an external magnetic field in the soft magnetic underlayer. The soft magnetic underlayer is brought into a substantially single-domain state by the magnetic field. Reducing or eliminating multiple domains addresses the noise problem noted above. In a preferred embodiment, the magnetization in such a single-domain state is aligned radially without local domain walls. It is noted that a "single-domain" state is an approximation, which applies to materials without any magnetic defects. In actual magnetic films, the film will be magnetically saturated in accordance with the present invention in order to sufficiently reduce the number of domain walls, thus suppressing soft underlayer noise.

An aspect of the present invention is to provide a perpendicular magnetic recording medium including a soft magnetic underlayer and means for generating a magnetic field in the soft magnetic underlayer.

Another aspect of the present invention is to provide a perpendicular magnetic recording medium which includes a soft magnetic underlayer, a hard magnetic recording layer over the soft magnetic underlayer, and at least one magnetic region which generates a magnetic field in the soft magnetic underlayer.

A further aspect of the present invention is to provide a method of making a perpendicular magnetic recording medium. The method includes the steps of providing at least one magnetic region on a substrate disk, and providing a soft magnetic underlayer and a hard magnetic recording layer on the substrate disk in proximity to the at least one magnetic region. The magnetic region generates a magnetic field in the soft magnetic underlayer.

These and other aspects of the present invention will be more apparent from the following description.

DETAILED DESCRIPTION

Figure 1:
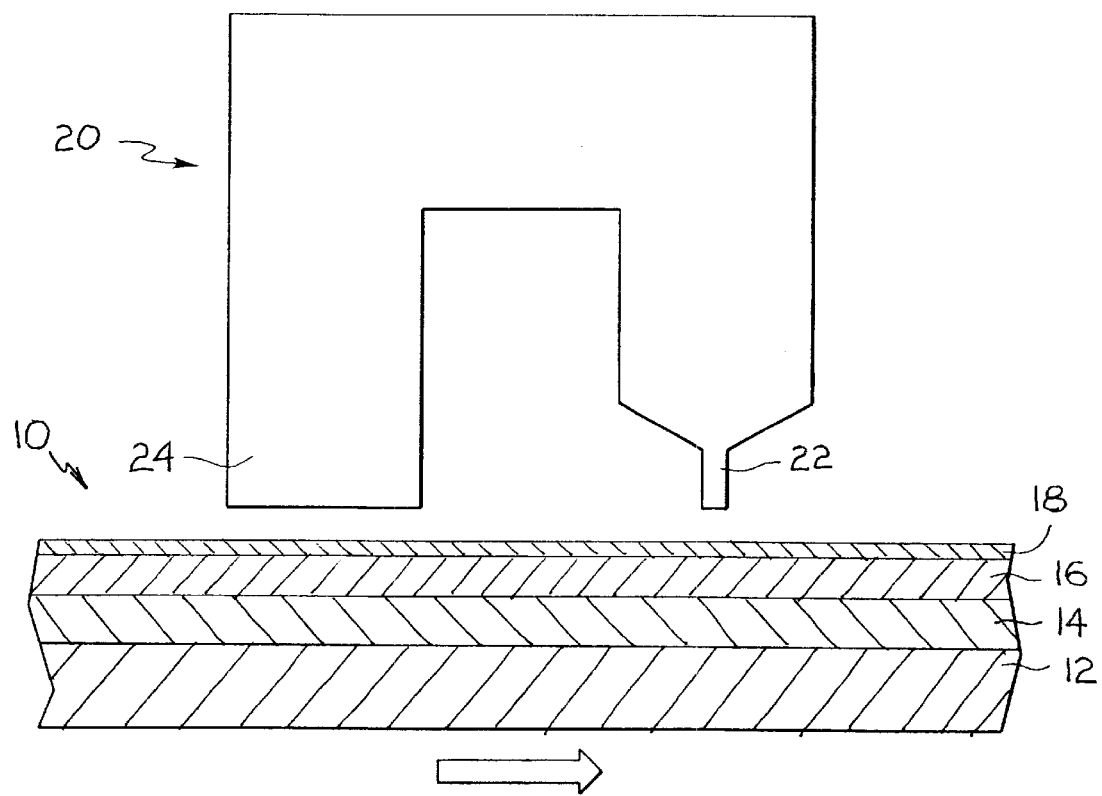
FIG. 1 is a partially schematic side view of a perpendicular recording head and a perpendicular recording medium which may incorporate a reduced-noise soft magnetic underlayer in accordance with an embodiment of the present invention.

FIG. 1 is a partially schematic side sectional view of a perpendicular magnetic recording medium 10. The medium 10 includes a substrate 12, which may be made of any suitable material such as ceramic glass, amorphous glass or NiP plated AlMg. A magnetically soft underlayer 14 is deposited on the substrate 12. Suitable soft magnetic materials for the underlayer 14 include CoFe and alloys thereof, FeAlN, NiFe, CoZrNb and FeTaN, with CoFe and FeAlN being preferred soft materials. A magnetically hard recording layer 16 is deposited on the soft underlayer 14. Suitable hard magnetic materials for the recording layer 16 include multilayers of Co/Pd or Co/Pt, L10 phases of CoPt, FePt, CoPd and FePd and hcp Co alloys, with such multilayers and L10 phases being preferred hard materials. A protective overcoat 18 such as diamond-like carbon may be applied over the recording layer 16.

FIG. 1 also illustrates a perpendicular recording head 20 positioned above the magnetic recording medium 10. The recording head 20 includes a main pole 22 and an opposing pole 24. During recording operations, magnetic flux is directed from the main pole 22 perpendicularly through the recording layer 16, then in the plane of the soft underlayer 14 back to the opposing pole 24.

Figure 2:
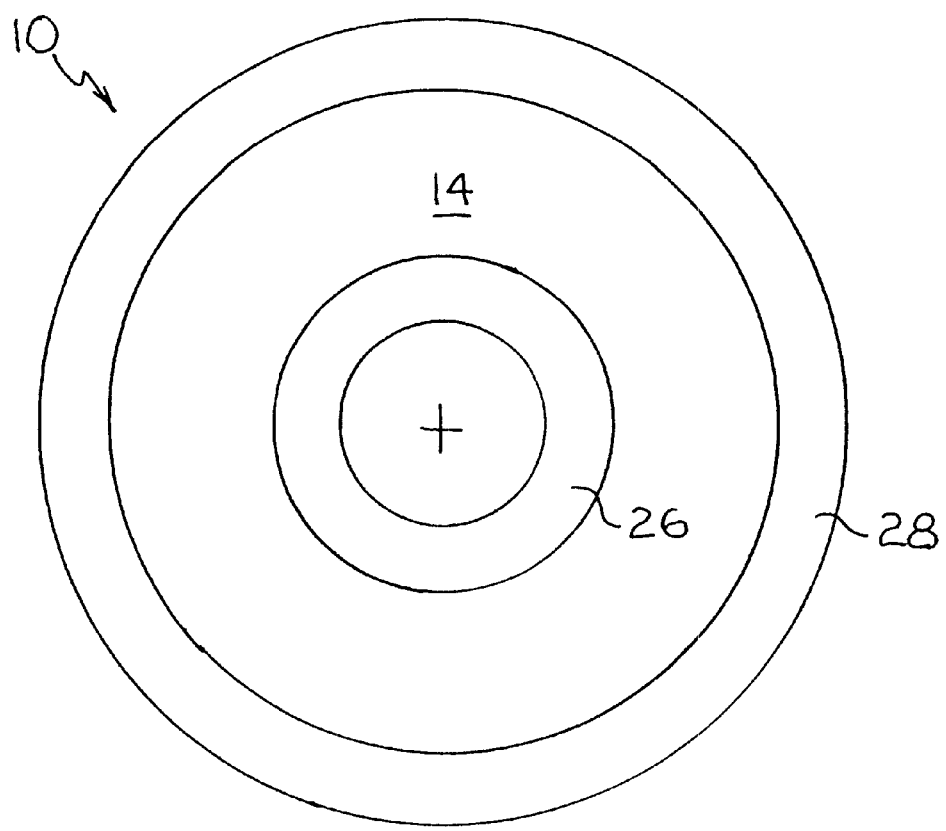
FIG. 2 is a partially schematic top view of a perpendicular recording medium illustrating a soft magnetic underlayer and hard magnetic regions which generate a radial magnetic field in the soft underlayer in accordance with an embodiment of the present invention.

A partially schematic top view of the magnetic recording medium 10 is shown in FIG. 2. The ring-shaped soft magnetic underlayer 14 is positioned between an inner magnetic ring-shaped band 26 and an outer magnetic ring-shaped band 28. The inner and outer magnetic bands 26 and 28 may be made of any suitable magnetic material such as hcp Co alloys (e.g., $CoPt_{12}Cr_{13}$ with $M_S \sim 600$ emu/cc and $4\pi M_S$~7.5 kG), L10 phases of FePt, CoPt, FePd or CoPd (e.g., with $M_S$~1,200 emu/cc and $4\pi M_S$~15 kG), L10 alloys such as FePtB, and rare earth magnetic materials such as NdFeB (e.g., with $4\pi M_S$~14 kG) and SmCo (e.g., with $4\pi M_S$~12 kG), with such hcp Co alloys L10 phases being preferred materials. The size, shape and magnetic characteristics of the magnetic bands 26 and 28 may be selected as necessary in order to provide a sufficient magnetic field radially through the soft underlayer 14. For example, the radial width of each magnetic band 26 and 28 may typically range from about 0.1 to about 100 mm, and the thickness of each magnetic band 26 and 28 may typically range from about 0.1 to about 50 microns. The radial width of the soft underlayer 14 typically ranges from about 5 to about 100 mm.

Although continuous concentric circular magnetic bands 26 and 28 are shown in FIG. 2, other geometries may be used as long as a sufficient magnetic field is generated in the soft underlayer 14. For example, discontinuous ring-shaped bands may be used, e.g., the bands may have gaps around their circumferences. Furthermore, non-circular bands may be used, e.g., square, octagonal, etc. Alternatively, multiple discrete magnetic elements may be arranged in a desired pattern. Although two concentric bands 26 and 28 are shown in FIG. 2, any suitable number of bands may be used, e.g., one, two, three, four, etc. The magnetic bands 26 and 28 may be deposited on a disk substrate in the presence of radial magnetic field. Deposition in a radial magnetic field causes net remanent magnetization in the magnetic bands to be aligned radially, which, in turn, creates a radially distributed magnetic field in the plane of the disk substrate between the bands.

Figure 3:
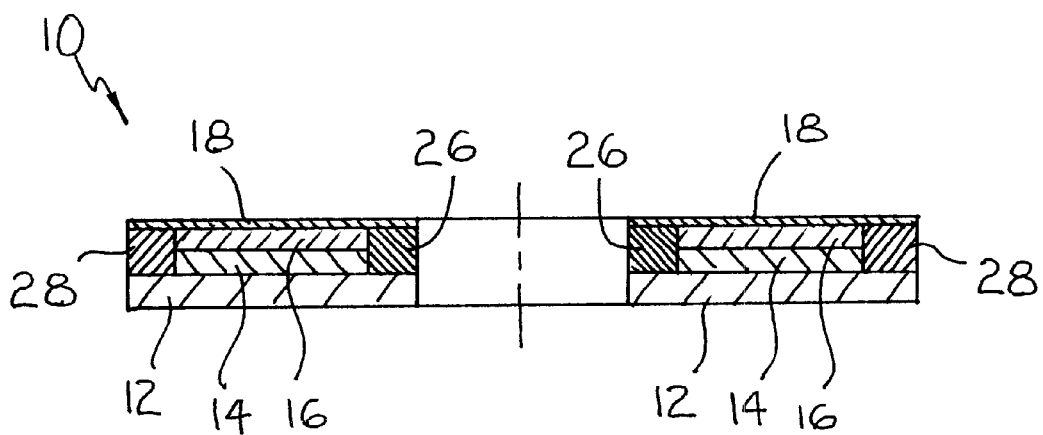
FIG. 3 is a partially schematic radial section view of a perpendicular recording medium including hard magnetic regions which generate a radial magnetic field in the soft underlayer in accordance with an embodiment of the present invention.

FIG. 3 is a partially schematic side sectional view of the magnetic recording medium 10 in accordance with an embodiment of the invention. Although a single-sided disk is shown in FIG. 3, double-sided media may alternatively be used. The soft underlayer 14 is located between the magnetic bands 26 and 28. Preferably, the soft underlayer 14 and at least a portion of the magnetic bands are located in the same plane, as shown in FIG. 3. The thicknesses of the soft underlayer 14 and the magnetic bands 26 and 28 may be different, as shown in FIG. 3, or their thicknesses may be the same.

As shown in FIG. 3. The magnetic recording layer 16 is applied on, and is preferably coextensive with, the soft underlayer 14. The protective coating 18 is applied over the recording layer 16 and the magnetic bands 26 and 28.

The soft underlayer 14 preferably has radial anisotropy with the easy axis aligned along the radius of the disk and a coercivity smaller than the minimum radial field induced by the magnetic bands 26 and 28. The magnetic bands 26 and 28 typically generate fields in excess of 10 Oe, more preferably in excess of 50 or 60 Oe.

To make a soft underlayer with built-in radial anisotropy several approaches can be used. Deposition in an external radial magnetic field (field induced anisotropy) may be used. Magnetostriction may be used if the soft underlayer film is deposited on an appropriate underlayer that would induce radially aligned stress in the soft underlayer film. Post-deposition annealing of the soft underlayer in radially aligned magnetic field may also be used.

If the coercivity of the soft underlayer material 14 is smaller than the fields generated by the concentric magnetic bands 26 and 28, the entire soft underlayer 14 will be saturated radially in the direction of the applied field. Radially aligned magnetization also improves dynamic properties of the soft underlayer and reduces Barkhausen noise since the magnetization switching during the write process inside the soft underlayer will follow magnetization rotation rather than domain wall motion, which is known to be a faster and less noisy process.

The present recording media may be manufactured using conventional media tools. All of the structures of the disk are of macroscopic sizes and do not require complicated lithography as, for example, patterned servo technologies or patterned media. Deposition of the magnetic features on a disk substrate can be done directly utilizing shadow masks placed in proximity of the substrate. For example, the magnetic bands 26 and 28 may first be deposited using a shadow mask. Next, another shadow mask may be used to deposit the soft underlayer 14 and the recording layer 16. After the second shadow mask is removed, the protective overcoat 18 may be deposited over the recording layer 16 and magnetic bands 26 and 28.

Both boundary element modeling and analytical calculations show that fields with the magnitudes of about 6 to 60 Oe or higher can be achieved in accordance with the present invention, for example, with band separation of 2 cm, hard magnetic material thicknesses of 1–10 $\mu$m, and $4\pi M_S$ of about 14 kG for NdFeB ($4\pi M_S$~12 kG for SmCo). If stronger fields are necessary, thicker bands can be deposited. For example, if an hcp Co alloy is used, e.g., CoPtCr with $M_S$~600 emu/cc, $4\pi M_S$~7.5 kG, the thickness of the bands may be increased (almost doubled in the case of $CoPt_{12}Cr_{13}$ alloy) in order to achieve fields comparable to the fields generated with NdFeB or SmCo.

The magnetic field from a single band may be expressed as:

$$H \sim 4\pi M_S \cdot \delta \left[ \frac{1}{r} - \frac{1}{r+w} \right],$$

where $\delta$ is the thickness of the magnetic band, w is the radial width of the band, and r is the radial distance away from the edge of the band. For a band made of NdFeB with $4\pi M_S$~14 kG, thickness $\alpha$ of 10 $\mu$m, r=1 cm, and w=0.3 cm, the field H is equal to about 32 Oe. Provided that there is a second magnetic band, e.g., as shown in FIG. 2, the magnitude of the achievable field doubles to approximately 64 Oe.

Whereas particular embodiments of this invention have been described above for purposes of illustration, it will be evident to those skilled in the art that numerous variations of the details of the present invention may be made without departing from the invention as defined in the appended claims.

What is claimed is:

1. A perpendicular magnetic recording medium comprising a ring shaped soft magnetic underlayer and at least one permanent magnet at least partially in a plane defined by the soft magnetic underlayer generating a magnetic field in the soft magnetic underlayer.

2. The perpendicular magnetic recording medium of claim 1, wherein the soft magnetic underlayer is ring shaped and the magnetic field is generated in a radial direction in the soft magnetic underlayer.

3. A perpendicular magnetic recording medium comprising:
   a soft magnetic underlayer;
   a hard magnetic recording layer having data stored therein over the soft magnetic underlayer; and
   at least one permanent magnet at least partially in a plane defined by the soft magnetic underlayer which generates a magnetic field in the soft magnetic underlayer.

4. The perpendicular magnetic recording medium of claim 3, wherein the soft magnetic underlayer is ring shaped.

5. The perpendicular magnetic recording medium of claim 4, wherein the magnetic field is generated in a radial direction in the soft magnetic underlayer.

6. The perpendicular magnetic recording medium of claim 5, wherein the at least one permanent magnet is ring shaped.

7. The perpendicular magnetic recording medium of claim 6, wherein the at least one permanent magnet is radially inside the soft magnetic underlayer.

8. The perpendicular magnetic recording medium of claim 6, wherein the at least one permanent magnet is radially outside the soft magnetic underlayer.

9. The perpendicular magnetic recording medium of claim 6, wherein the medium comprises at least two of the ring shaped permanent magnets.

10. The perpendicular magnetic recording medium of claim 9, wherein the ring shaped permanent magnets are concentric.

11. The perpendicular magnetic recording medium of claim 10, wherein at least a portion of the soft magnetic underlayer is located between the concentric permanent magnets.

12. The perpendicular magnetic recording medium of claim 6, wherein the medium comprises two of the ring shaped permanent magnets, the ring shaped permanent magnets are concentric, and the soft magnetic underlayer is located between the concentric permanent magnets.

13. The perpendicular magnetic recording medium of claim 12, wherein each of the ring shaped permanent magnets has a radial width of from about 1 to about 10 mm, and the soft magnetic underlayer has a radial width of from about 5 to about 100 mm.

14. The perpendicular magnetic recording medium of claim 3, wherein the at least one permanent magnet and the soft magnetic underlayer have different thicknesses.

15. The perpendicular magnetic recording medium of claim 3, wherein the magnetic field generated in the soft magnetic underlayer is greater than about 10 Oe.

16. The perpendicular magnetic recording medium of claim 3, wherein the magnetic field generated in the soft magnetic underlayer is greater than about 50 Oe.

17. A method of making a perpendicular magnetic recording medium, the method comprising:

providing at least one permanent magnet on a substrate disk; and providing a ring shaped soft magnetic underlayer and a hard magnetic recording layer on the substrate disk adjacent to the at least one permanent magnet, wherein the at least one permanent magnet is at least partially located in a plane defined by the soft magnetic underlayer and generates a magnetic field in the soft magnetic underlayer.

18. The method of claim 17, wherein the at least one permanent magnet is provided by depositing concentric rings of magnetic material on the substrate, and the soft magnetic underlayer is provided by depositing soft magnetic material between the concentric rings.

19. The method of claim 18, further comprising depositing a protective coating over the concentric rings and the hard magnetic recording layer.

20. A perpendicular magnetic recording medium comprising:

a ring shaped soft magnetic underlayer;

a hard magnetic recording layer over the soft magnetic underlayer; and concentric ring shaped magnetic regions located on either side of the ring shaped soft magnetic layer which generate a radial magnetic field in the soft magnetic underlayer, wherein each of the ring shaped magnetic regions has a radial width of from about 1 to about 10 mm, and the soft magnetic underlayer has a radial width of from about 5 to about 100 mm.

21. A perpendicular magnetic recording disk comprising:

a soft magnetic underlayer;

a hard magnetic underlayer over the soft magnetic underlayer; and at least one permanent magnet located radially inside or radially outside the soft magnetic layer which generates a magnetic field in the soft magnetic underlayer.

22. The perpendicular magnetic recording medium of claim 21, wherein the medium comprises at least two of the permanent magnets, one of the permanent magnets is located radially inside the soft magnetic layer, and another one of the permanent magnets is located radially outside the soft magnetic layer.

23. The perpendicular magnetic recording medium of claim 21, wherein the at least one permanent magnet is located at least partially in a plane defined by the soft magnetic underlayer.

24. A magnetic recording structure comprising:

a soft magnetic underlayer;

a hard magnetic recording layer having data stored therein over the soft magnetic underlayer; and at least one permanent magnet at least partially in a plane defined by the soft magnetic underlayer which generates a magnetic field in the soft magnetic underlayer.

* * * * *